US012771450B2

(12) United States Patent
Hoshi et al.

(10) Patent No.: US 12,771,450 B2
(45) Date of Patent: Oct. 20, 2026

(54) OPTICAL TRANSMISSION SYSTEM, OPTICAL TRANSMISSION METHOD, AND RELAY AMPLIFIER

(71) Applicant: NTT, Inc., Tokyo (JP)

(72) Inventors: Megumi Hoshi, Musashino (JP); Koki Shibahara, Musashino (JP); Shimpei Shimizu, Musashino (JP); Yutaka Miyamoto, Musashino (JP)

(73) Assignee: NTT, Inc., Tokyo (JP)

( * ) Notice: Subject to any disclaimer, the term of this patent is extended or adjusted under 35 U.S.C. 154(b) by 197 days.

(21) Appl. No.: 18/850,187

(22) PCT Filed: Mar. 29, 2022

(86) PCT No.: PCT/JP2022/015641
§ 371 (c)(1),
(2) Date: Sep. 24, 2024

(87) PCT Pub. No.: WO2023/188027
PCT Pub. Date: Oct. 5, 2023

(65) Prior Publication Data
US 2025/0219733 A1 Jul. 3, 2025

(51) Int. Cl.
*H04B 10/2507* (2013.01)
*H04B 10/25* (2013.01)
(Continued)

(52) U.S. Cl.
CPC ............ *H04B 10/29* (2013.01); *H04B 10/25* (2013.01); *H04B 10/2507* (2013.01); *H04J 14/052* (2023.08); *H04J 14/06* (2013.01)

(58) Field of Classification Search
CPC .... H04B 10/25; H04B 10/2507; H04B 10/29; H04J 14/052; H04J 14/06
(Continued)

(56) References Cited

U.S. PATENT DOCUMENTS 6,304,348 B1 * 10/2001 Watanabe .......... H04B 10/2531 398/9
6,307,984 B1 * 10/2001 Watanabe .......... H04B 10/2563 359/332
(Continued)

FOREIGN PATENT DOCUMENTS

JP 2016206390 A * 12/2016
JP 2020014113 A * 1/2020
WO WO-2020116013 A1 * 6/2020 .............. H04J 14/05

OTHER PUBLICATIONS

D.J. Richardson et al., "Space-division multiplexing in optical fibres", nature photonics, vol. 7, May 2013, 354-362.

*Primary Examiner* — Li Liu

(57) ABSTRACT

An optical transmission system comprising: an optical transmitter; an optical receiver; and a relay amplification device for amplifying and relaying an optical signal, in which the optical transmitter and the relay amplification device are connected by a first multi-core fiber, the optical receiver and the relay amplification device are connected by a second multi-core fiber, in which the relay amplification device includes a branch unit for branching optical signals transmitted by respective cores of the first multi-core fiber into a plurality of single-core fibers, a spectrum inversion unit for performing optical parametric amplification on the respective optical signals with pump lights to output phase conjugate lights of respective optical signals generated by the optical parametric amplification; and a multiplex unit for multiplexing the phase conjugate lights of the respective optical signals output from the spectrum inversion unit to output the multiplexed lights to the second multi-core fiber.

8 Claims, 11 Drawing Sheets

(51) Int. Cl.
*H04B 10/29* (2013.01)
*H04J 14/00* (2006.01)
*H04J 14/06* (2006.01)

(58) Field of Classification Search
USPC .......................... 398/142, 158–160, 175, 180
See application file for complete search history.

(56) References Cited

U.S. PATENT DOCUMENTS

| | | | | |
|---|---|---|---|---|
| 2013/0071119 | A1* | 3/2013 | Liu | H04B 10/516<br>398/159 |
| 2017/0272163 | A1* | 9/2017 | Alic | H04B 10/25133 |
| 2020/0381888 | A1* | 12/2020 | Mizuno | G02B 6/02 |

* cited by examiner

OPTICAL TRANSMISSION SYSTEM, OPTICAL TRANSMISSION METHOD, AND RELAY AMPLIFIER

CROSS-REFERENCE TO RELATED APPLICATIONS

This application is a 371 U.S. National Phase of International Application No. PCT/JP2022/015641, filed on Mar. 29, 2022. The entire disclosure of the above application is incorporated herein by reference.

TECHNICAL FIELD

The present invention relates to an optical transmission system, an optical transmission method, and a relay amplification device.

BACKGROUND ART

In recent years, communication traffic in an optical communication system has increased year by year. A single-mode fiber is used as a base of a current large capacity optical network. The single-mode fiber is an optical transmission line having a single-core in a clad. By using a single-mode fiber as an optical transmission line, a network for stably transmitting a large amount of information over a long distance has been realized.

In recent years, an optical transmission network of 100 Giga-bits per second or more per wavelength channel has been put into practical use through a digital coherent transmission technique combining a coherent transmission/reception technique utilizing intensity and phase information of light and a digital signal processing for compensating signal distortion. Digital coherent transmission can also cope with polarized wave multiplex optical transmission using the property that two light waves having orthogonal relation do not cross to each other and different information can be placed, and contributes to the drastic improvement of information transmission efficiency.

Even if the digital coherent transmission and the polarization multiplexed optical transmission are used in combination, the number of wavelength channels is increased by wavelength division multiplexing (WDM), and transmission is performed in a wide band; however, the capacity which can be transmitted by the single-mode fiber is expected to be about 100 Tera-bits per second as a physical upper limit. Therefore, it is feared that this limit will be reached in the future. In order to realize a large capacity transmission of Peta-bit class in view of future realization of a very large capacity optical transport network, expansion of transmission capacity by introduction of Space Division Multiplexing (SDM) as described in the following NPL 1 has been actively studied.

In performing SDM transmission, a multi-core fiber (MCF) is used as one of optical transmission line media. The multi-core fiber is an optical transmission line having a plurality of cores serving as lines for optical signals in a clad. The multi-core fiber is a medium capable of realizing spatial multiplexing by increasing the number of cores in the fiber. In particular, the non-coupled multi-core fiber is characterized in that since each core is used as an independent transmission line, it is easy to expand from a single-mode fiber and increase the number of spatial multiplexing. By carrying independent information on the optical signal transmitted through each core, the transmission capacity per fiber is expected to be improved by the number of cores.

CITATION LIST

Non Patent Literature

[NPL 1] D. J. Richardson, et al., "Space-division multiplexing in optical fibers," Nat. Photonics 7(5), 354.

SUMMARY OF INVENTION

Technical Problem

However, in an optical transmission line using MCF, inter-core crosstalk (hereinafter referred to as "XT") becomes a cause of increasing the code error rate. Therefore, in order to realize a future large capacity optical transmission network, the problem is how to reduce XT. In the long wavelength band, since the refractive index is small and the mode field diameter is large, the XT which is the light leaked from the adjacent core is also increased accordingly. In order to widen the band of the system, management of the wavelength direction of signal design parameters such as a modulation format and a coding rate of a signal is required, and as a result, cost increase and complication of the system are feared.

In view of the above-mentioned circumstances, the present invention aims to provide a technique capable of reducing wavelength dependence of inter-core crosstalk accumulation in multi-core fiber transmission or reducing inter-core crosstalk amount itself.

Solution to Problem

An aspect of the present invention is an optical transmission system, including:

- an optical transmitter;
- an optical receiver; and
- a relay amplification device for amplifying and relaying an optical signal, where the optical transmitter and the relay amplification device are connected by a first multi-core fiber, and the optical receiver and the relay amplification device are connected by a second multi-core fiber, where the relay amplification device, including:

- a branch unit for branching the optical signals transmitted by respective cores of the first multi-core fiber into a plurality of single-core fibers;
- a spectrum inversion unit for performing optical parametric amplification on the respective optical signals branched into the respective single fibers with pump lights to output phase conjugate lights of the respective optical signals generated by the optical parametric amplification; and
- a multiplex unit for multiplexing the phase conjugate lights of the respective optical signals output from the spectrum inversion unit to output the multiplexed lights to the second multi-core fiber.

An aspect of the present invention is an optical transmission system, including:

- an optical transmitter;
- an optical receiver; and
- a multi-core fiber for connecting the optical transmitter and the optical receiver;

where the optical transmitter including:

a division unit for dividing a usage band of an optical signals into two; and an optical signal transmission unit for transmitting the optical signals to the respective cores of the multi-core fiber so that the optical signals with different usage bands is transmitted to congenial core having large inter-core crosstalk.

An aspect of the present invention is an optical transmission method in an optical transmission system, the system, including an optical transmitter;

an optical receiver; and a relay amplification device for amplifying and relaying an optical signal, where the optical transmitter and the relay amplification device are connected by a first multi-core fiber, and the optical receiver and the relay amplification device are connected by a second multi-core fiber, where the method including the steps of:

branching the optical signals transmitted by the respective cores of the first multi-core fiber into a plurality of single-core fibers;

performing optical parametric amplification on the respective optical signals branched into the respective single-core fibers with pump lights to output phase conjugate lights of the optical signals generated by the optical parametric amplification; and multiplexing the output phase conjugate lights of the optical signals to output to the second multi-core fiber.

An aspect of the present invention is a relay amplification device for amplifying and relaying an optical signal in an optical transmission system, the system further including:

an optical transmitter; and an optical receiver; where the relay amplification device including:

a branch unit for branching the optical signals transmitted by respective cores of a first multi-core fiber connected with the optical transmitter into a plurality of single-core fibers;

a spectrum inversion unit for performing optical parametric amplification on the respective optical signals branched into the respective single-core fibers with pump lights to output the phase conjugate lights of the respective optical signals generated by the optical parametric amplification; and a multiplex unit for multiplexing the phase conjugate lights of the respective optical signals output from the spectrum inversion unit to output the multiplexed lights to the first multi-core fiber connected with the optical receiver.

Advantageous Effects of Invention

According to the present invention, it is possible to achieve reduction in wavelength dependence of inter-core crosstalk accumulation in multi-core fiber transmission or reduction in inter-core crosstalk amount itself.

DESCRIPTION OF EMBODIMENTS

An embodiment of the present invention will be described below with reference to the drawings.

Embodiment 1

Figure 1:
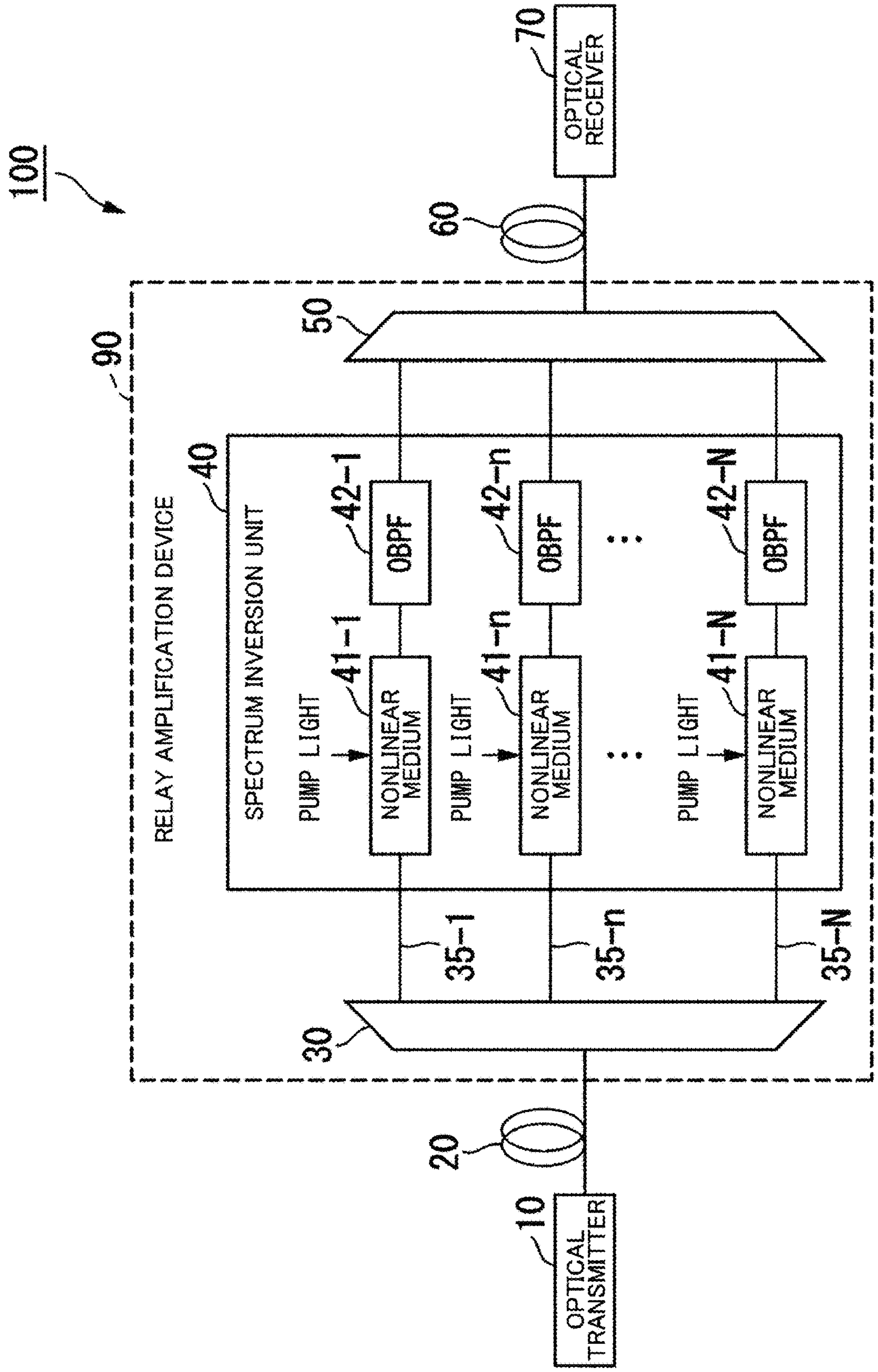
FIG. 1 A diagram showing a configuration example of an optical transmission system according to a first embodiment.

FIG. 1 is the diagram showing a configuration example of an optical transmission system 100 according to a first embodiment. The optical transmission system 100 includes an optical transmitter 10, a multi-core optical transmission line 20 (a first multi-core fiber), a fan-out optical connector 30, N (N is an integer of 2 or more) single-core optical transmission lines 35-1 to 35-N, a spectrum inversion unit (spectrum inverter) 40, a fan-in optical connector 50, a multi-core optical transmission line 60 (a second multi-core fiber), and an optical receiver 70.

The optical transmitter 10 and the fan-out optical connector 30 are connected by the multi-core optical transmission line 20. The fan-out optical connector 30, the spectrum inversion unit 40, and the fan-in optical connector 50 are connected by N single-core optical transmission lines 35-1 to 35-N. The fan-in optical connector 50 and the optical receiver 70 are connected by the multi-core optical transmission line 60. In the following description, when N single-core optical transmission lines 35-1 to 35-N are not distinguished, they will be referred as a single-core optical transmission line 35.

The fan-out optical connector 30, the spectrum inversion unit 40, and the fan-in optical connector 50 are configured as a relay amplification device 90. Although FIG. 1 shows the configuration in which one relay amplification device 90 is provided between the optical transmitter 10 and the optical receiver 70, the relay amplification device 90 may be provided at every constant distance interval between the optical transmitter 10 and the optical receiver 70.

The multi-core optical transmission lines 20 and 60 are multi-core optical fibers having N cores. The multi-core optical transmission lines 20 and 60 transmit optical signals input to the respective cores. The single-core optical transmission line 35 is a single-core fiber having a single core. The single-core optical transmission line 35 transmits an optical signal input to a single core.

The optical transmitter 10 generates a WDM signal with wavelength division multiplexing optical signals with different wavelengths. The optical transmitter 10 transmits the generated WDM signal to each core of the multi-core optical transmission line 20.

The fan-out optical connector 30 is an optical device for branching an optical signal of each core included in the multi-core optical transmission line 20 to each single-core optical transmission line 35. The fan-out optical connector 30 is one aspect of a branch unit (brancher).

The spectrum inversion unit 40 optically parametric-amplifies each optical signal transmitted by each single-core optical transmission line 35 with pump light. With optical parametric amplification, phase conjugate light corresponding to each optical signal input to the spectrum inversion unit 40 is generated. The spectrum inversion unit 40 outputs each phase conjugate light generated by optical parametric amplification. Thus, the spectrum inversion unit 40 inverts the spectrum of each optical signal transmitted through each single-core optical transmission line 35 to output thereof.

The spectrum inversion unit 40 is provided with N nonlinear media 41-1 to 41-N and N OBPFs 42-1 to 42-N.

The nonlinear media 41-1 to 41-N are, for example, secondary nonlinear optical media such as periodic polarization inversion lithium niobate lithium (PPLN) elements. As the nonlinear media 41-1 to 41-N, a nonlinear optical medium of an arbitrary order can be used. The nonlinear media 41-1 to 41-N perform optical parametric amplification by multiplexing the pump light to the optical signals transmitted through the single-core optical transmission lines 35-1 to 35-N. For example, the nonlinear medium 41-1 performs the optical parametric amplification by multiplexing pump light to the optical signal transmitted through the single-core optical transmission line 35-1.

The optical parametric amplification is one of nonlinear optical processes, in which the pump light with frequency $f_E$ [Hz] and the optical signal with frequency $f_S$ [Hz] are simultaneously input to the nonlinear medium 41, so that the optical signal is amplified by energy transferring from $f_E$ to $f_S$, and simultaneously an optical signal with frequency $(f_E-f_S)$ is generated. The newly generated optical signal with the frequency $(f_E-f_S)$ is called an idler light and has a phase conjugate relation with the optical signal. This idler light is just a phase conjugate light. When the frequency of the pump light is set to be $f_E=2f_0$ [Hz] and the frequency of the optical signal is set to be $f_S=f_0\pm f_1$ [Hz], then the phase conjugate light is generated at a position of $2f_0-(f_0+f_1)=f_0-+f_1$ [Hz] (− of "−+" is above +). When a plurality of wavelength channels are used by wavelength division multiplexing the optical signal and optical parametric amplification is applied to these channels, then the optical signal after conversion becomes a shape in which the spectrum is symmetrically inverted with $f_0$ as an axis. The nonlinear media 41-1 to 41-N output each amplified optical signal and each phase conjugate light generated by optical parametric amplification.

The OBPFs 42-1 to 42-N are, for example, optical band-pass filters. The OBPFs 42-1 to 42-N pass an optical signal of a determined frequency band and cut off an optical signal other than the determined frequency band. In this embodiment, it is assumed that the OBPFs 42-1 to 42-N are set so as to cut off the amplified optical signal and pass the phase conjugate light.

The fan-in optical connector 50 is an optical device for multiplexing phase conjugate lights passed through the OBPFs 42-1 to 42-N and transmitted by each single-core optical transmission line 35. The fan-in optical connector 50 outputs the multiplexed phase conjugate light to each core of the multi-core optical transmission line 60. The fan-in optical connector 50 is one aspect of a multiplexing unit (multiplexer).

The optical receiver 70 receives an optical signal (multiplexed phase conjugate light) transmitted through each core of the multi-core optical transmission line 60.

Figure 2:
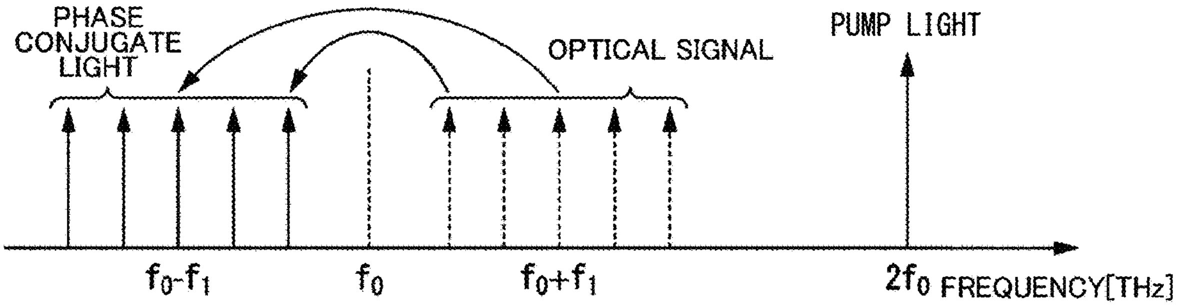
FIG. 2 A schematic diagram showing a WDM signal transmitted by an optical transmitter and a spectrum of an optical signal obtained by wavelength-converting the WDM signal with a spectrum inversion unit.
Figure 3:
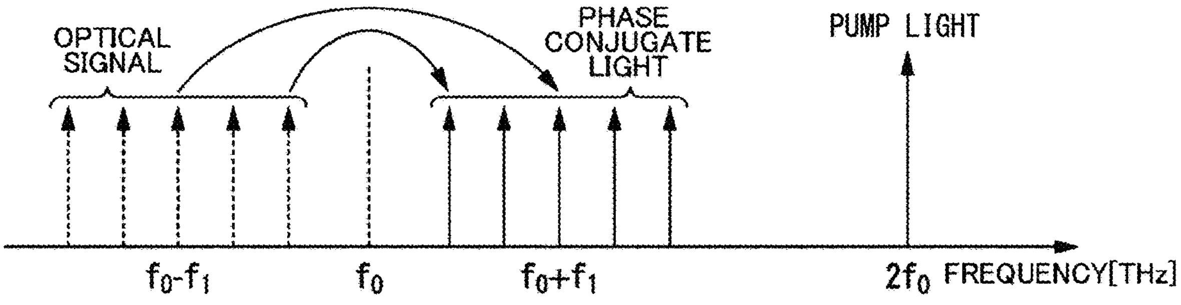
FIG. 3 A schematic diagram showing a WDM signal transmitted by an optical transmitter and a spectrum of an optical signal obtained by wavelength-converting the WDM signal with a spectrum inverting unit.

FIGS. 2 and 3 are schematic diagrams showing the WDM signal transmitted by the optical transmitter 10 and the spectrum of the optical signal obtained by wavelength-converting the WDM signal with the spectrum inversion unit 40. FIG. 2 shows a schematic diagram of a spectrum when an optical signal having a frequency $f_S=f_0+f_1$ [THz] and an pump light having a frequency $2f_0$ [THz] are simultaneously input to the nonlinear medium 41. In this case, as shown in FIG. 2, phase conjugate light having a frequency $f_0-f_1$ [THz] is generated.

FIG. 3 shows a schematic diagram of a spectrum when an optical signal having a frequency $f_S=f_0-f_1$ [THz] and an pump light having a frequency $2f_0$ [THz] are simultaneously inputted to the nonlinear medium 41. In this case, as shown in FIG. 3, phase conjugate light having a frequency $f_0+f_1$ [THz] is generated.

Figure 4:
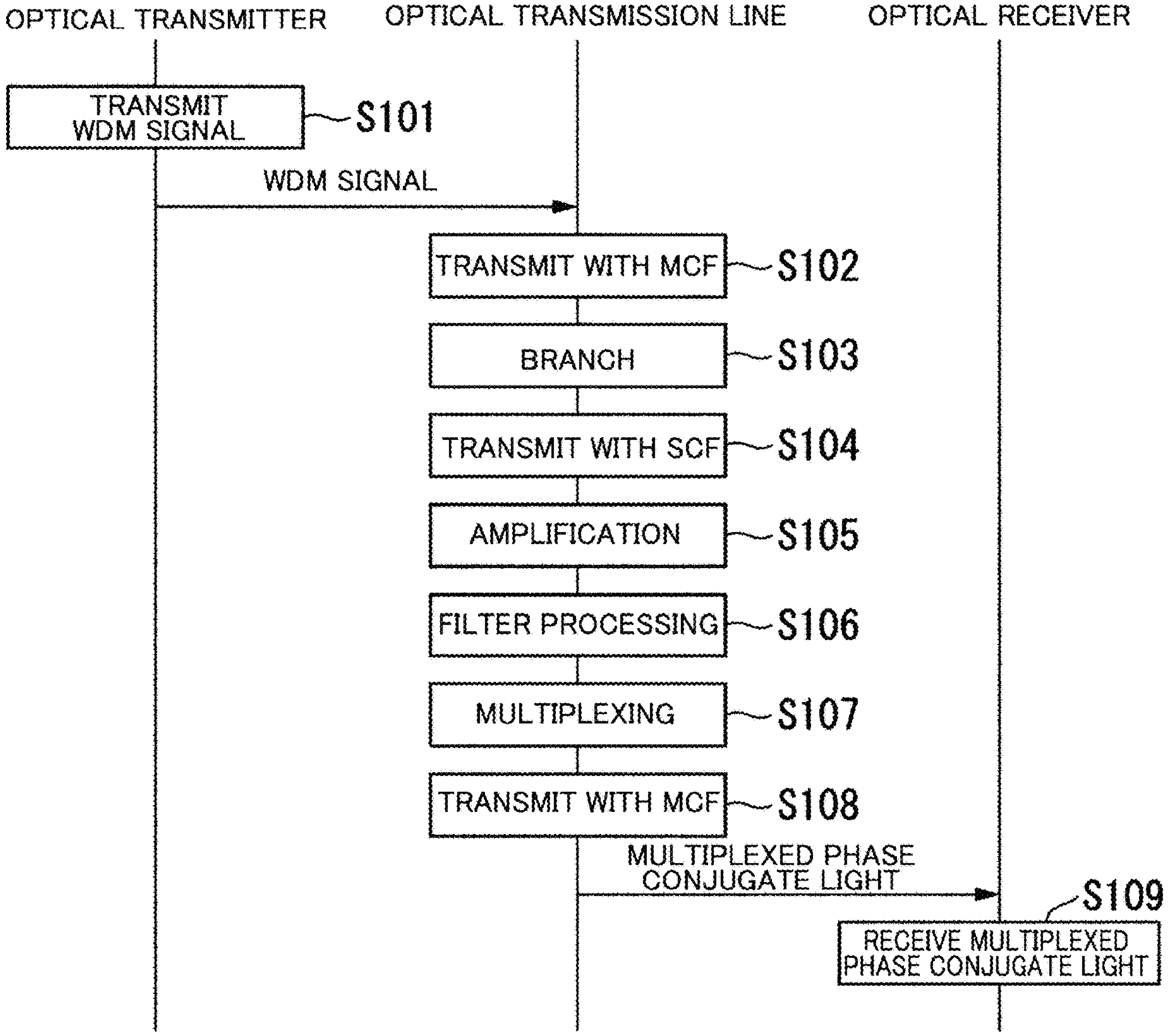
FIG. 4 A sequence diagram showing a flow of processing of the transmission system according to the first embodiment.

FIG. 4 is the sequence diagram showing the flow of processing of the optical transmission system 100 according to the first embodiment. In FIG. 4, the structure provided between the optical transmitter 10 and the optical receiver 70 will be generally referred to as an optical transmission line or the like.

The optical transmitter 10 generates the WDM signal by wavelength division multiplexing optical signals with different wavelengths, and outputs the generated WDM signal to each core of the multi-core optical transmission line 20 (step S101). The WDM signal output to each core of the multi-core optical transmission line 20 is transmitted by each core of the multi-core optical transmission line 20 and input to the fan-out optical connector 30 (step S102).

The fan-out optical connector 30 branches the WDM signal input from each core of the multi-core optical transmission line 20 into single-core optical transmission lines 35-1 to 35-N (step S103). The output ports of the fan-out optical connector 30 are connected to the single-core optical transmission lines 35-1 to 35-N. Thus, the WDM signals input from each core of the multi-core optical transmission line 20 are output to single-core optical transmission lines 35-1 to 35-N corresponding to each core.

The WDM signals input to the single-core optical transmission lines 35-1 to 35-N are transmitted and input to nonlinear media 41-1 to 41-N of the spectrum inversion unit 40 (step S104). For example, the WDM signal input to the single-core optical transmission line 35-1 is input to the nonlinear medium 41-1 of the spectrum inversion unit 40. The WDM signal input to the single-core optical transmission line 35-N is input to the nonlinear medium 41-N of the spectrum inversion unit 40.

In the nonlinear media 41-1 to 41-N, the input WDM signal and the pump light are multiplexed to perform optical parametric amplification (step S105). The phase conjugate light is generated in the nonlinear media 41-1 to 41-N by optical parametric amplification. The WDM signal amplified by the nonlinear media 41-1 to 41-N and the newly generated phase conjugate light are subjected to filter processing by the OBPFs 42-1 to 42-N (step S106).

Specifically, the amplified WDM signal is cut off by the OBPFs 42-1 to 42-N, and only the phase conjugate light is passed through. Each phase conjugate light output from the OBPFs 42-1 to 42-N is input to the fan-in optical connector 50. The fan-in optical connector 50 multiplexes the input phase conjugate lights (step S107). Thus, the fan-in optical connector 50 generates a multiplexed phase conjugate light. The fan-in optical connector 50 outputs the generated multiplexed phase conjugate light to each core of the multi-core optical transmission line 60.

The multiplexed phase conjugate light output to each core of the multi-core optical transmission line 60 is transmitted by each core of the multi-core optical transmission line 60 and input to the optical receiver 70 (step S108). The optical receiver 70 receives the multiplexed phase conjugate light input from each core of the multi-core optical transmission line 60 (step S109).

Figure 5:
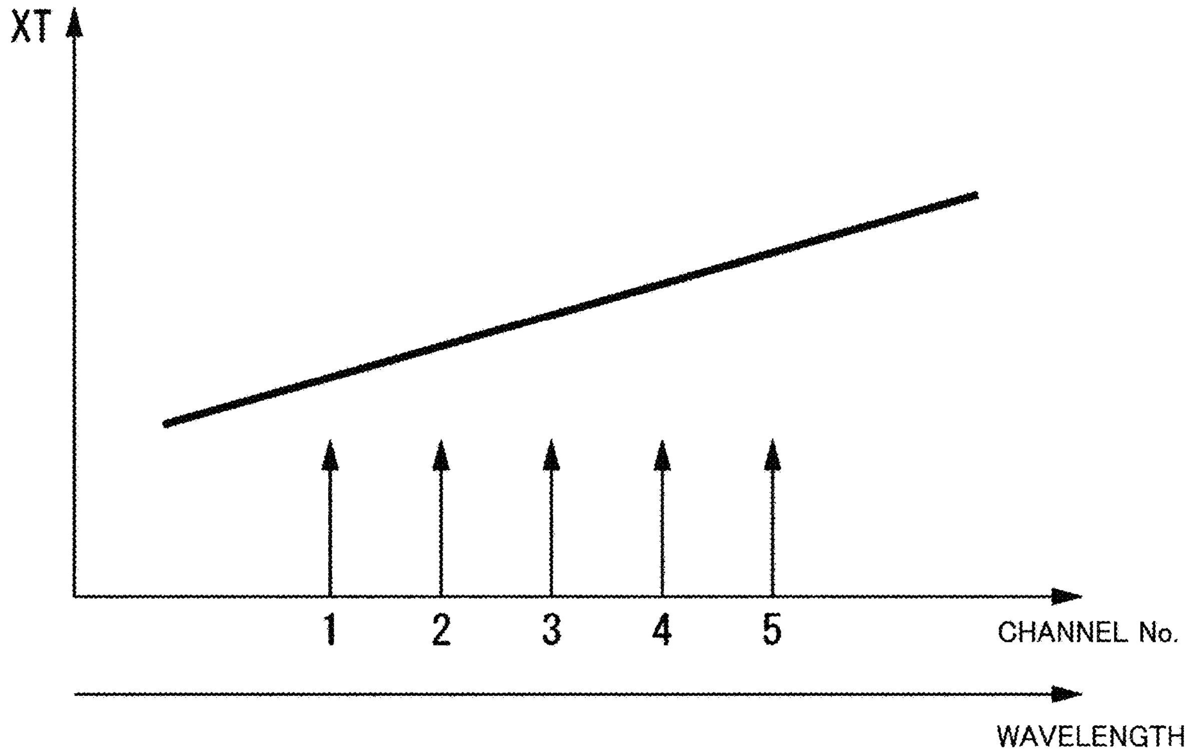
FIG. 5 A schematic diagram in which the XT amounts at each wavelength are accumulated.
Figure 6:
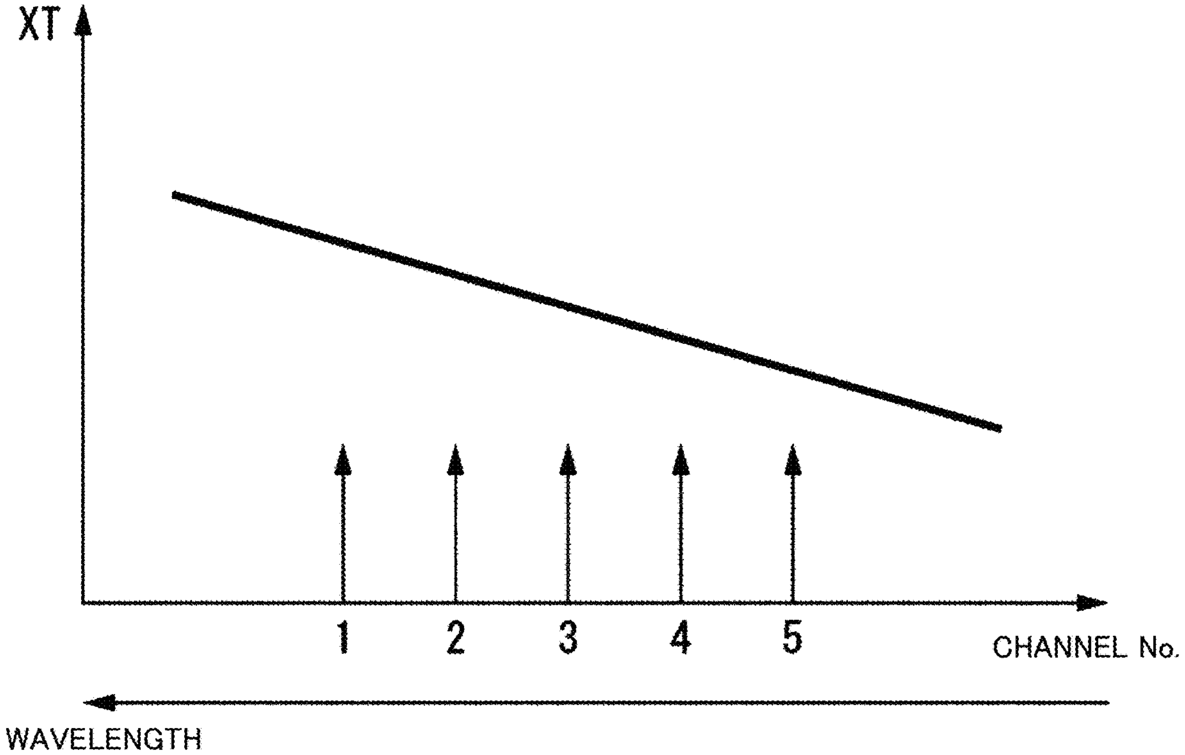
FIG. 6 A schematic diagram in which the XT amounts at each wavelength are accumulated.

Next, the accumulation of the XT amounts at each wavelength in the structure shown in FIG. 1 will be described. FIGS. 5 and 6 are schematic diagrams showing the accumulation of XT amounts at respective wavelengths. FIG. 5 shows the XT amount generated in the multi-core optical transmission line 20, and FIG. 6 shows the XT amount generated in the multi-core optical transmission line 60. As shown in FIG. 5, the WDM optical signal passing through the multi-core optical transmission line 20 has high XT in a long wavelength (low frequency) region. On the other hand, as shown in FIG. 6, since the multiplexed phase conjugate light passing through the multi-core optical transmission line 60 is subjected to spectrum inversion, the signal of the channel in a long wavelength (low frequency) side of high XT is converted to a short wavelength (high frequency) side, then XT becomes low. Therefore, it can be seen that the wavelength channel dependency of the accumulated XT amount can be reduced.

The optical transmission system 100 configured as described above includes: the optical transmitter 10 for transmitting the wavelength multiplexed signal (WDM signal) to the each core of the multi-core optical transmission line 20; the fan-out optical connector 30 for branching the optical signal transmitted by each core of the multi-core optical transmission line 20 into the plurality of optical single-core optical transmission lines 35; the spectrum inversion unit 40 for performing the optical parametric amplification on each optical signal branched into each single-core optical transmission line 35 with the pump light to output the phase conjugate light of each optical signal generated by the optical parametric amplification; and the fan-in optical connector 50 for multiplexing the phase conjugate lights of each optical signal output from the spectrum inversion unit 40 to output to the multi-core optical transmission line 60.

As described above, when the optical parametric amplification is applied to a plurality of wavelength channels by wavelength division multiplexing of the optical signal, the optical signal after conversion has a form in which the spectrum is symmetrically inverted with respect to a reference frequency as an axis. The spectrum inversion is performed to the optical signal passing through the multi-core optical transmission line 20 with superimposing the large XT at the long wavelength band, and the XT amount received by the same optical signal in the multi-core optical transmission line 60 next passing through becomes the XT amount at the short wavelength band, so that an accumulated XT amount originally different between wavelength channels can be effectively relaxed. Therefore, it is possible to achieve reduction in wavelength dependency of inter-core crosstalk accumulation in multi-core fiber transmission or reduction in inter-core crosstalk amount itself.

Second Embodiment

In the second embodiment, a structure in which the absolute amount of XT is reduced by utilizing the spatial property of the multi-core optical transmission line 20 will be described.

Figure 7:
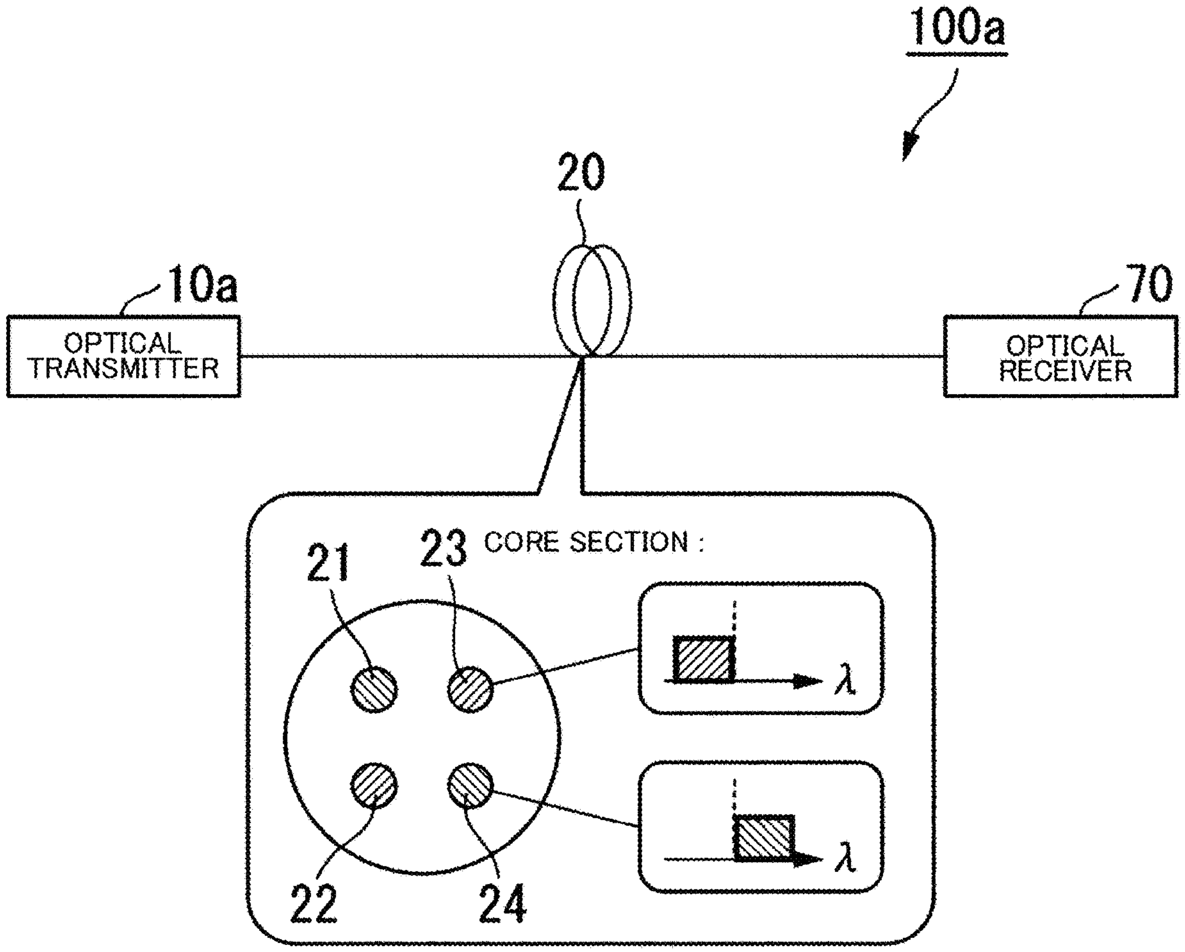
FIG. 7 A diagram showing a configuration example of an optical transmission system according to a second embodiment.

FIG. 7 is a diagram showing an example of a configuration of an optical transmission system 100*a* according to the second embodiment. The optical transmission system 100*a* includes an optical transmitter 10*a*, a multi-core optical transmission line 20, and an optical receiver 70. The optical transmitter 10*a* and the optical receiver 70 are connected by the multi-core optical transmission line 20.

The optical transmission system 100*a* is different in configuration from the optical transmission system 100 in that the optical transmitter 10*a* is provided in place of the optical transmitter 10. The optical transmission system 100*a* is the same as the optical transmission system 100 about other configurations. Hereinafter, the focus on the differences from the optical transmission system 100 will be described.

The optical transmitter 10*a* divides optical signals of different wavelengths into two groups (for example, a first group and a second group) in a frequency band, and transmits each optical signal to each core of the multi-core optical transmission line 20 so that optical signals with different frequency bands (optical signals of different groups) are transmitted to the congenial cores with large XT. The optical transmitter 10*a* includes a division unit and an optical signal transmission unit. The division unit divides a usage band of the optical signal into two. The optical signal transmission unit transmits the optical signal to each core of the multi-core optical transmission line 20 so that optical signals with different frequency bands are transmitted to the congenial cores with large XT.

More specifically, the division unit of the optical transmitter 10*a* divides optical signals with different wavelengths into the first group of optical signals having a high frequency component ($f<f_0$) and the second group of optical signals having a low frequency component ($f>f_0$), with a frequency f as a reference. The frequency f is the reference frequency for dividing the optical signal to be transmitted into the high frequency component and the low frequency component, and is preset.

The optical signal transmission unit of the optical transmitter 10*a* generates a first WDM signal by wavelength division multiplexing a plurality of optical signals with high frequency components ($f<f_0$) belonging to the first group, and a second WDM signal by wavelength division multiplexing a plurality of optical signals with low frequency components ($f>f_0$) belonging to the second group. The optical signal transmission unit transmits the first WDM signal and the second WDM signal through different cores. In this case, the optical transmitter 10*a* sets the bands of optical signals to be transmitted so as not to overlap with each other for congenial cores having large XT and takes a form of an interleave. The congenial cores having large XT are determined by a relative magnitude relation in this case, and if multi-core fibers have the same kind of core, the cores will be adjacent to each other.

In the example shown in FIG. 7, the multi-core optical transmission line 20 has four cores. Here, it is assumed that the combination of the cores in which XT becomes large is the core 21 and core 22, the core 21 and core 23, the core 23 and core 24, and the core 22 and core 24. Then, the combination of the cores in which XT does not become large is the core 21 and core 24, and the core 22 and core 23. In this case, the optical transmitter 10*a* is set so as to transmit an optical signal belonging to the same group (for example, the first WDM signal being the optical signal with the high frequency component) to the cores 21 and 24, and transmit the optical signal belonging to the same group (for example, the second WDM signal being the optical signal with the low frequency component) to the cores 22 and 23. Then, the optical transmitter 10*a* transmits the optical signal to each core of the multi-core optical transmission line 20 depending on the setting.

According to the optical transmission system 100*a* configured as described above, the optical transmitter 10*a* divides the usage band of the optical signal into two and transmits the optical signal to each core of the multi-core optical transmission line 20 so that the optical signal of the different usage band is transmitted to the congenial cores having large XT. Thus, the XT is not generated congenial cores having a large XT in the conventional case, and even though in a signal occupying the same band, the XT can be reduced as a whole because the original XT is low.

Third Embodiment

In the third embodiment, a configuration combining with the first and second embodiments will be described.

Figure 8:
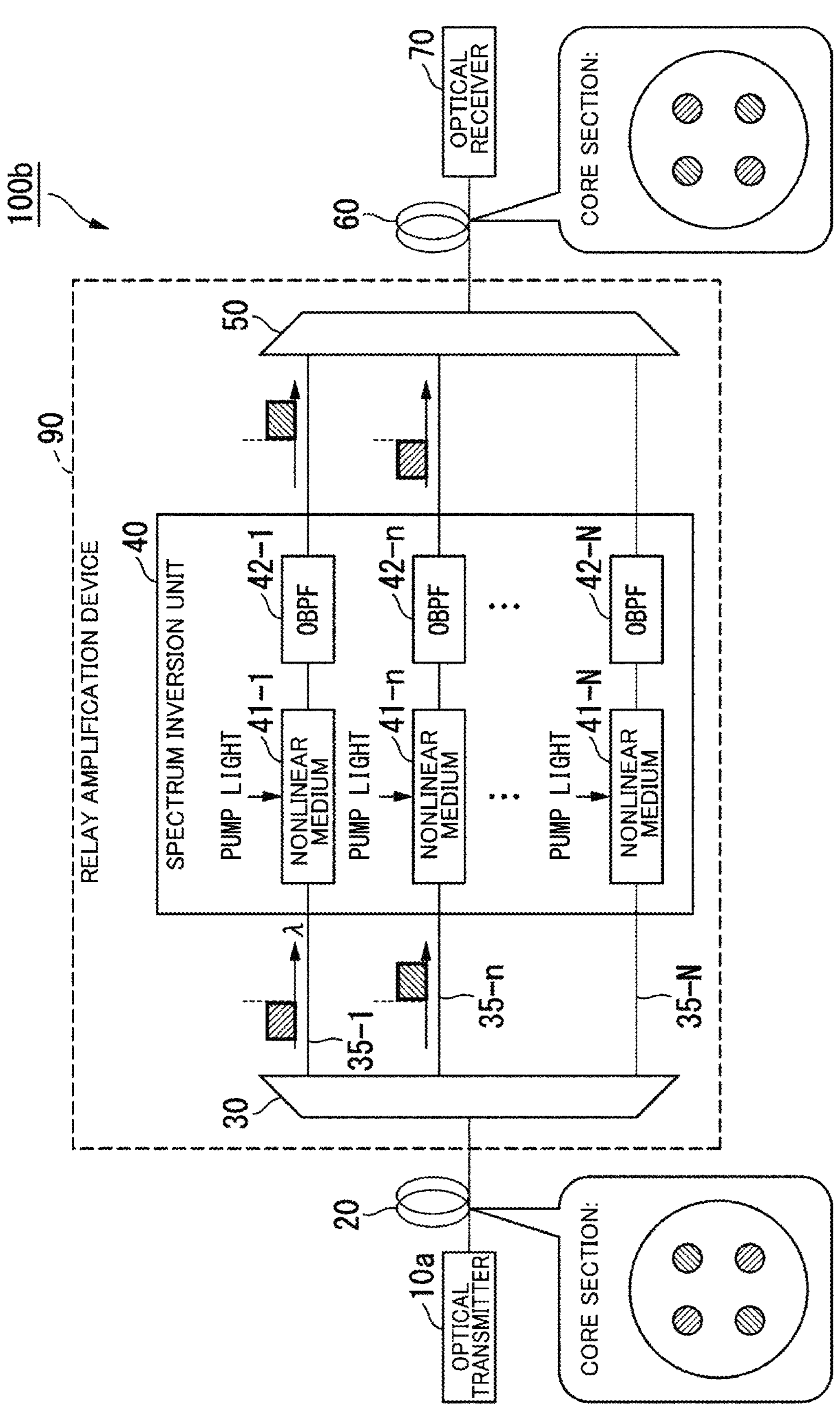
FIG. 8 A diagram showing a configuration example of an optical transmission system according to a third embodiment.

FIG. 8 is a diagram showing an example of a configuration exemplary of an optical transmission system 100*b* according to the third embodiment. The optical transmission system 100*b* includes an optical transmitter 10*a*, a multi-core optical transmission line 20, a fan-out optical connector 30, N single-core optical transmission lines 35-1 to 35-N, a spectrum inversion unit 40, a fan-in optical connector 50, a multi-core optical transmission line 60, and an optical receiver 70. The fan-out optical connector 30, the spectrum inversion unit 40, and the fan-in optical connector 50 are configured as a relay amplification device 90.

The optical transmitter 10*a* and the fan-out optical connector 30 are connected by the multi-core optical transmission line 20. The fan-out optical connector 30, the spectrum inversion unit 40, and the fan-in optical connector 50 are connected by a plurality of single-core optical transmission lines 35-1 to 35-N. The fan-in optical connector 50 and the optical receiver 70 are connected by the multi-core optical transmission line 60.

According to an operation in the optical transmission system 100*b*, the optical transmitter 10*a* divides optical signals with different wavelengths as the second embodiment into two groups (for example, a first group and a second group) in a frequency band, and transmits each optical signal to each core of the multi-core optical transmission line 20 so that optical signals having different frequency bands (optical signals in the different groups) are transmitted to congenial cores having a large XT. The optical signals transmitted through the respective cores of the multi-core optical transmission line 20 are subjected to the same processing as in the first embodiment (branching, spectrum inversion, filtering and multiplexing) in the relay amplification device 90, and output to the multi-core optical transmission line 60.

According to the optical transmission system 100*b* configured as described above, the optical transmitter 10*a* is set so that the bands of optical signals transmitted to congenial cores having a large XT do not overlap each other before and after spectrum inversion. If the band of the optical signal before the spectrum inversion is interleaved, the band of the optical signal after passing through the spectrum inversion unit 40 will be also interleaved. As a result, the XT can be reduced and the wavelength dependency of the XT can be reduced in the whole optical transmission system 100*b*.

Fourth Embodiment

In the optical parametric amplification, generally, it is necessary to secure a band after wavelength conversion in advance, then there is a problem that a transmittable band is reduced to a half or less. In the fourth embodiment, a configuration relaxing this problem will be described.

Figure 9:
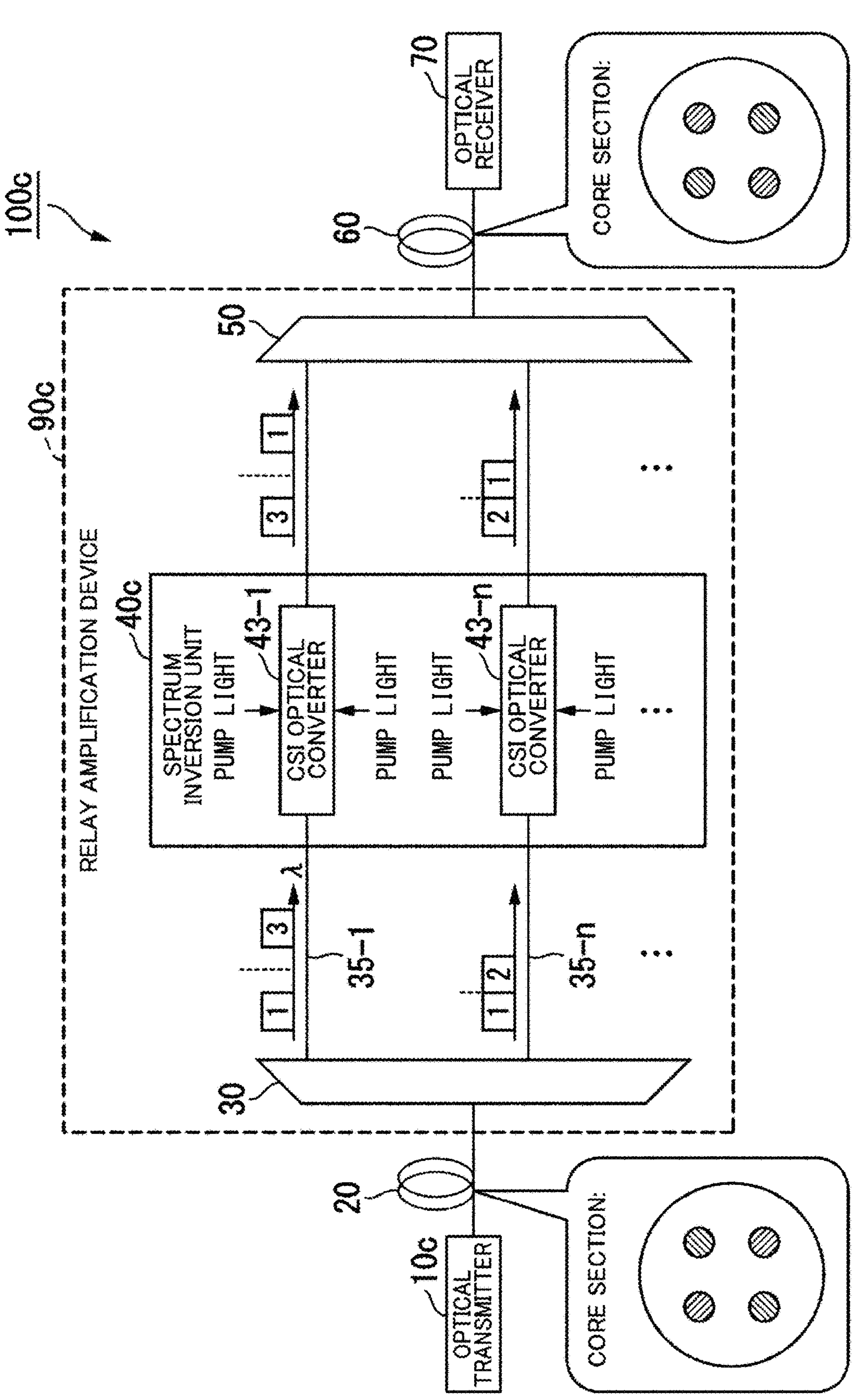
FIG. 9 A diagram showing a configuration example of an optical transmission system according to a fourth embodiment.

FIG. 9 is a diagram showing a configuration exemplary of an optical transmission system 100*c* according to the fourth embodiment. The optical transmission system 100*c* includes an optical transmitter 10*c*, a multi-core optical transmission line 20, a fan-out optical connector 30, N single-core optical transmission lines 35-1 to 35-N, a spectrum inversion unit 40*c*, a fan-in optical connector 50, a multi-core optical transmission line 60, and an optical receiver 70. The fan-out optical connector 30, the spectrum inversion unit 40*c* and the fan-in optical connector 50 are configured as a relay amplification device 90*c*.

The optical transmitter 10*c* and the fan-out optical connector 30 are connected by the multi-core optical transmission line 20. The fan-out optical connector 30, the spectrum inversion unit 40*c*, and the fan-in optical connector 50 are connected by a plurality of single-core optical transmission lines 35-1 to 35-N. The fan-in optical connector 50 and the optical receiver 70 are connected by the multi-core optical transmission line 60.

The optical transmission system 100*c* is different in configuration from the optical transmission system 100*b* in that the optical transmitter 10*c* and the spectrum inversion unit 40*c* instead of the optical transmitter 10 and the spectrum inversion unit 40. Other configurations of the optical transmission system 100*c* are similar to the optical transmission system 100*b*. Hereinafter, the focus on the differences from the optical transmission system 100*b* will be described.

In the optical transmission system 100*c*, the complementary spectrum inversion phase conjugate conversion technique described in the following reference 1 is used. (Reference 1: Japanese Patent No. 6096831, "phase-coupled optical converter and optical transmission system using the same").

The complementary spectrum inversion phase-conjugate conversion technique (CSI) is a technique for dividing a transmitted optical signal into a short wavelength band and a long wavelength band, performing optical parametric amplification on the signals of the respective bands, multiplexing the signals again, and processing the signals in the optical receiving unit. By using this technique, spectrum inversion can be performed without reducing the utilization band. On the other hand, if only the complementary spectrum inversion phase-conjugate conversion technique is applied, the band does not change before and after the spectrum inversion. Therefore, the XT reduction by the interleaving described in the second embodiment cannot be realized.

Then, the optical transmitter 10*c* divides optical signals having different wavelengths into three groups (for example, a first group, a second group, and a third group) in frequent band, and transmits optical signals of the two groups (two bands) among the three groups to one core. In this case, the optical transmitter 10*c* sets so that the group on the shortest wavelength side (band on the shortest wavelength side) is always included in each core. The optical transmitter 10*c* includes a division unit and an optical signal transmission unit. The division unit divides the usage band of the optical signal into three. The optical signal transmission unit selects, for each core, an optical signal belonging to each of two groups (two bands) among the three groups divided by the division unit as an optical signal to be transmitted to each core. In this case, the optical signal transmission unit selects optical signals belonging to each of two groups (two bands) for each core so that the optical signals of the group on the shortest wavelength side with relatively small XT are always included.

More specifically, the division unit divides optical signals of different wavelengths into a first group to a third group according to a predetermined reference. In the example shown in FIG. 9, the first group is indicated by "1", the second group is indicated by "2", and the third group is indicated by "3". It is assumed that the group on the shortest wavelength side among the three groups is the first group. In this case, when selecting two groups, the optical signal transmission unit selects two groups so as to include the first group which is the shortest wavelength side group without fail. For example, the optical signal transmission unit selects a combination of the first group and the second group or a combination of the first group and the third group.

The optical signal transmission unit generates a first WDM signal by wavelength division multiplexing a plurality of optical signals belonging to the first group and a plurality of optical signals belonging to the second group, and generates a second WDM signal by wavelength division multiplexing a plurality of optical signals belonging to the first group and a plurality of optical signals belonging to the third group. The optical signal transmission unit transmits the first WDM signal and the second WDM signal through different cores.

In a spectrum inversion unit 40*c*, an optical signal transmitted by each core (for example, WDM signal) is subjected to spectrum inversion symmetrically with a complementary spectrum inversion phase conjugate conversion technique. The wavelength of the pump light differs in each core.

The spectrum inversion unit 40*c* is provided with N pieces of CSI optical converters 43-1 to 43-N. The CSI optical converters 43-1 to 43-N perform spectrum inversion symmetrically to a plurality of input optical signals with a complementary spectrum inversion phase conjugate conversion technique.

Figure 10:
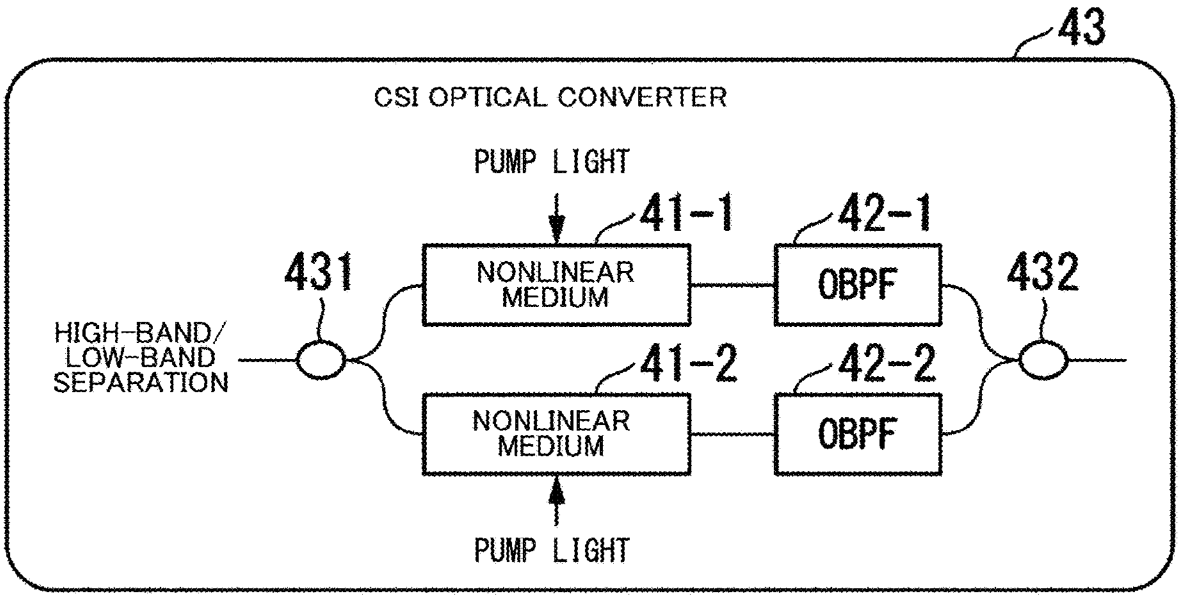
FIG. 10 A diagram showing a configuration example of a CSI optical converter in the fourth embodiment.

FIG. 10 is a diagram showing a configuration example of the CSI optical converter 43 according to the fourth embodiment. The CSI optical converter 43 includes a wavelength separation filter 431, two nonlinear media 41-1 to 41-2, two OBPFs 42-1 to 42-2, and a wavelength multiplexing filter 432.

The wavelength separation filter 431 separates the plurality of input optical signals into a short wavelength side component (short wavelength signal) and a long wavelength side component (long wavelength signal). In the example shown in the present embodiment, a plurality of input optical signals are separated into a component on the short wavelength side and a component on the long wavelength side with the center wavelength in the entire wavelength band of the WDM signal as a reference wavelength, but the reference wavelength may not necessarily be the center wavelength. The optical signal of the component on the short wavelength side separated by the wavelength separation filter 431 is input to the nonlinear medium 41-1. The optical signal of the component on the long wavelength side separated by the wavelength separation filter 431 is input to the nonlinear medium 41-2.

The nonlinear medium 41-1 multiplexes the pump light with the optical signal of the component on the short wavelength side output from the wavelength separation filter 431. Thus, the nonlinear medium 41-1 amplifies the optical signal of the component on the short wavelength side through optical parametric amplification, and simultaneously generates the phase conjugate light of the optical signal of the component on the short wavelength side. In this case, the phase conjugate light of the optical signal of the component on the short wavelength side is generated on the long wavelength side in the form of being folded on the wavelength axis with the center wavelength as a reference. The nonlinear medium 41-1 outputs the optical signal of the component on the short wavelength side after amplification and the phase conjugate light of the optical signal of the component on the short wavelength side to the OBPF 42-1.

The nonlinear medium 41-2 multiplexes the pump light with the optical signal of the long wave side component output from the wavelength separation filter 431. Thus, the nonlinear medium 41-2 amplifies the optical signal of the component on the long wavelength side through optical parametric amplification, and simultaneously generates the phase conjugate light of the optical signal of the component on the long wavelength side. In this case, the phase conjugate light of the optical signal of the component on the long wavelength side is generated on the short wave side in the form of being folded on the wavelength axis with the center wavelength as a reference. The nonlinear medium 41-2 outputs the optical signal of the component on the long wave side after amplification and the phase conjugate light of the optical signal of the component on the long wave side to the OBPF 42-2.

The OPBF 42-1 cuts off the optical signal of the component on the short wavelength side after amplification output from the nonlinear medium 41-1, while passes through the phase conjugate light of the optical signal of the component on the short wavelength side.

The OPBF 42-2 cuts off the optical signal of the component on the long wavelength side after amplification output from the nonlinear medium 41-2, while passes through the phase conjugate light of the optical signal of the component on the long wavelength side.

The wavelength multiplexing filter 432 multiplexes the phase conjugate light of the optical signal of the component on the short wavelength side passed through by the OPBF 42-1 and the phase conjugate light of the optical signal of the component on the long wavelength side passed through by the OPBF 42-2.

According to the optical transmission system 100*c* constituted as described above, the optical signal is divided into three groups in the frequency band, and XT in a short wavelength region where XT is relatively small is allowed. Thus, only the band of the shortest wavelength with the small XT overlaps before and after wavelength conversion, and the remaining two bands do not overlap. Therefore, the XT can be reduced while relaxing the reduction of the utilization band.

Fifth Embodiment

Since the PPLN has polarization dependency, only a single polarization optical signal can be subjected to spectrum inversion in the configurations of the first, third and fourth embodiments. The above-described each embodiment cannot apply to a polarization multiplexed signal. Therefore, in the fifth embodiment, a configuration capable of applying the polarization multiplexed signal will be described.

Figure 11:
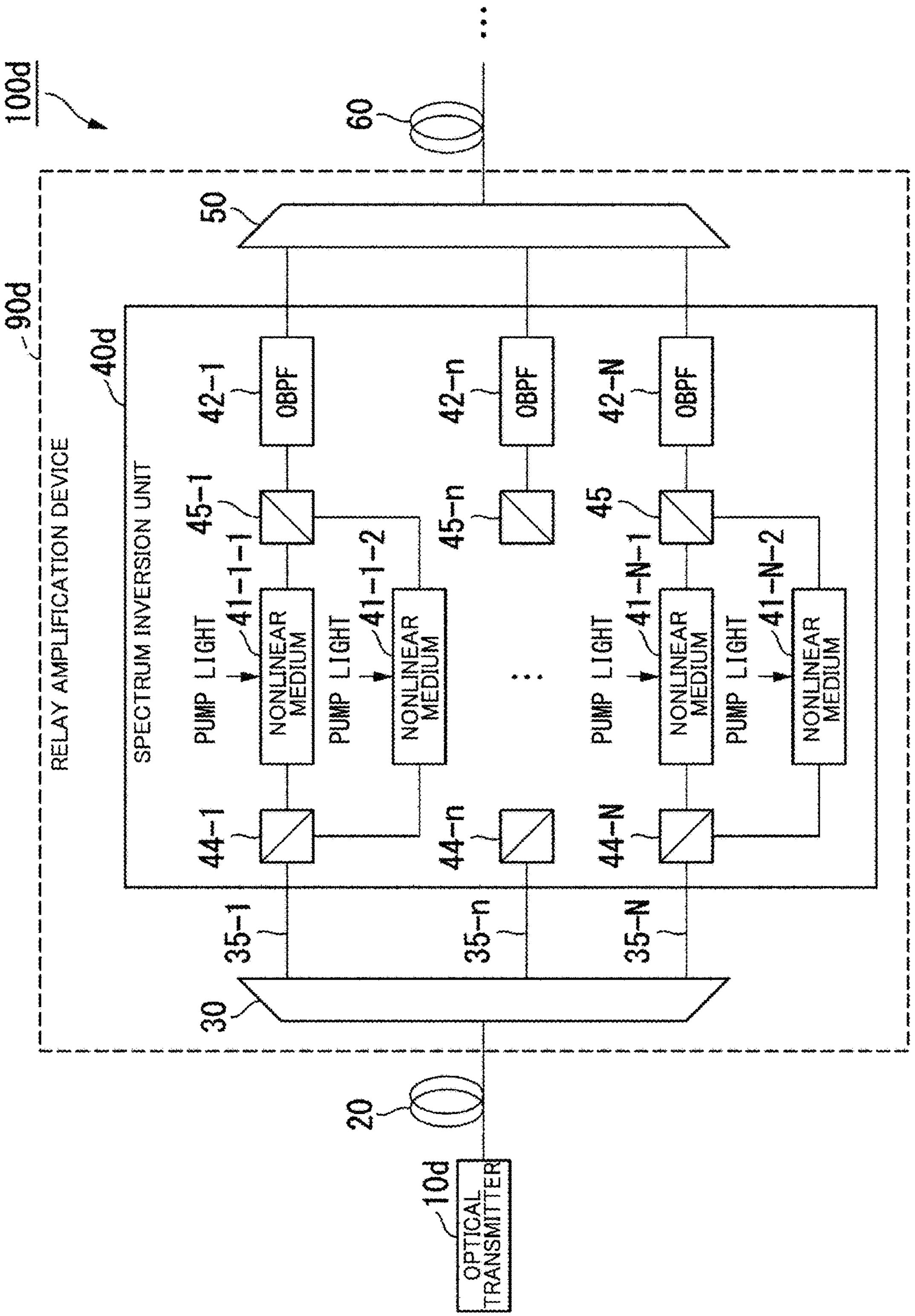
FIG. 11 A diagram showing a configuration example of an optical transmission system according to a fifth embodiment.

FIG. 11 is a diagram showing an example of a configuration an optical transmission system 100*d* according to the fifth embodiment. The optical transmission system 100*d* includes an optical transmitter 10*d*, a multi-core optical transmission line 20, a fan-out optical connector 30, N single-core optical transmission lines 35-1 to 35-N, a spectrum inversion unit 40*d*, a fan-in optical connector 50, and a multi-core optical transmission line 60. In FIG. 11, the optical receiver 70 is omitted.

The optical transmitter 10*d* and the fan-out optical connector 30 are connected by the multi-core optical transmission line 20. The fan-out optical connector 30, the spectrum inversion unit 40*d*, and the fan-in optical connector 50 are connected by a plurality of single-core optical transmission lines 35-1 to 35-N. The fan-in optical connector 50 and the optical receiver 70 are connected by the multi-core optical transmission line 60. The fan-out optical connector 30, the spectrum inversion unit 40*d* and the fan-in optical connector 50 are configured as a relay amplification device 90*d*.

The optical transmission system 100*d* is different in configuration from the optical transmission system 100 in that providing an optical transmitter 10*d* and a spectrum inversion unit 40*d* instead of the optical transmitter 10 and the spectrum inversion unit 40. The optical transmission system 100*d* has the same as the optical transmission system 100 about other configurations.

The optical transmitter 10*d* transmits a polarization multiplexed signal generated by polarization multiplexing to each core of the multi-core optical transmission line 20. The optical transmitter 10*d* may further perform wavelength multiplexing.

The spectrum inversion unit 40*d* is provided with N pieces of polarization beam splitters 44-1 to 44-N, 2N pieces of nonlinear media 41-1-1 to 41-N–2, N pieces of polarization beam combiners 45-1 to 45-N, and N pieces of OBPFs 42-1 to 42-N. Two nonlinear media 41 are connected to one polarization beam splitter 44.

The polarization beam splitters 44-1 to 44-N receive the polarization multiplexed signal transmitted by the single-core optical transmission lines 35-1 to 35-N. Polarization beam splitters 44-1 to 44-N separate the received polarization multiplexed signal into optical signals as respective polarized waves (vertical polarized wave and horizontal polarized wave). The polarization beam splitters 44-1 to 44-N output the optical signal as vertical polarization and the optical signal as horizontal polarization to different nonlinear medium 41. For example, the polarization beam splitter 44-1 outputs the optical signal as vertical polarization to the nonlinear medium 41-1-1 and the optical signal as horizontal polarization to the nonlinear medium 41-1-2.

Nonlinear media 41-1-1 to 41-N–2 perform optical parametric amplification by multiplexing the pump lights to the optical signals of respective polarized waves separated by the polarization beam splitters 44-1 to 44-N. Thus, the nonlinear media 41-1-1 to 41-N–2 respectively perform spectrum inversion on the optical signals as respective polarized waves. With optical parametric amplification, phase conjugate light corresponding to the optical signal as each polarized wave is generated.

Polarization beam combiners 45-1 to 45-N multiplex the optical signals as the respective polarized waves output from the nonlinear media 41-1-1 to 41-N–2 and the phase conjugate light corresponding to the optical signals as the respective polarized waves. For example, the polarization beam combiner 45-1 multiplexes the optical signal as vertical polarization and the phase conjugate light corresponding to the optical signal as vertical polarization output from the nonlinear medium 41-1-1, and the optical signal as horizontal polarization and the phase conjugate light corresponding to the optical signal as horizontal polarization output from the nonlinear medium 41-1-2.

According to the optical transmission system 100*d* configured as described above is also capable of applying the polarization multiplexed signal, so that a polarization diversity configuration can be obtained.

Sixth Embodiment

In principle, the first to fifth embodiments can be realized with one time spectrum inversion over the entire optical transmission line, if it is designed that the transmission distances before and after the inversion are equal. However, in an actual optical transmission line, it is supposed that an optical signal is added from the middle of the optical transmission line or an optical signal is taken out therefrom. Therefore, in the sixth embodiment, a configuration which can be applied to a case where an optical signal is added to the middle of the optical transmission line or a case where an optical signal is taken out therefrom will be described. The configuration of the sixth embodiment may be combined with any one of configurations of the first to the fifth embodiments.

When an optical signal is added to or branched from in the middle of the optical transmission line, the wavelength dependency and absolute quantity of the XT can be reduced each time by performing spectrum inversion after the optical signal is added to the middle of the optical transmission line or the optical signal is branched from the middle of the optical transmission line. At this time, if the condition that the transmission distance becomes equal before and after the inversion is satisfied, the number of times of spectrum inversion is not limited.

Figure 12:
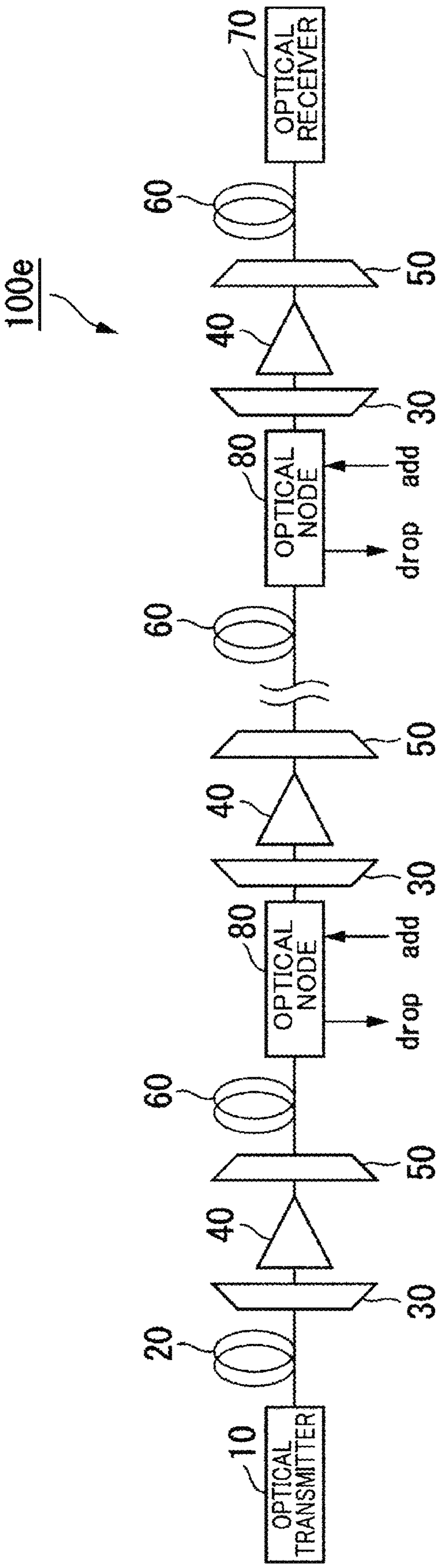
FIG. 12 A diagram showing a configuration example of an optical transmission system according to a sixth embodiment.

FIG. 12 is a diagram showing an example of a configuration of an optical transmission system 100*e* according to the sixth embodiment. The optical transmission system 100*e* includes an optical transmitter 10, a multi-core optical transmission line 20, a plurality of fan-out optical connectors 30, a plurality of spectrum inversion units 40, a plurality of fan-in optical connectors 50, a multi-core optical transmission line 60, an optical receiver 70, and one or more optical nodes 80.

The optical transmitter 10 and the fan-out optical connector 30 are connected by the multi-core optical transmission line 20. The fan-out optical connector 30, the spectrum inversion unit 40 and the fan-in optical connector 50 are connected by a single-core optical transmission line (not shown). The fan-in optical connector 50 and the optical node 80 are connected by the multi-core optical transmission line 60. The optical node 80 and the fan-out optical connector 30 are connected by the multi-core optical transmission line 20. The fan-in optical connector 50 and the optical receiver 70 are connected by the multi-core optical transmission line 60. One fan-out optical connector 30, one spectrum inversion unit 40 and one fan-in optical connector 50 are constituted as one relay amplification device 90. Accordingly, in the example shown in FIG. 12, three relay amplification devices 90 are provided.

The optical transmission system 100*e* has a configuration different from that of the optical transmission system 100 in that a plurality of relay amplification devices 90 and a plurality of optical nodes 80 are provided between the optical transmitter 10 and the optical receiver 70. The optical transmission system 100*e* has the same as the optical transmission system 100 about other configurations.

The optical node 80 is an optical add-drop multiplexer having a function of multiplexing an optical signal of a specific wavelength with an optical signal transmitted through the multi-core optical transmission line 60 or extracting an optical signal of a specific wavelength from the optical signal transmitted through the multi-core optical transmission line 60. An optical signal obtained by multiplexing an optical signal of a specific wavelength by the optical node 80 or an optical signal obtained by removing the optical signal of a specific wavelength by the optical node 80 is amplified and spectrum inverted by the relay amplification device 90 in a stage subsequent to the optical node 80.

The optical transmission system 100*e* configured as described above is applicable to the case where an optical signal is added to the middle of the optical transmission line, or the case where an optical signal is extracted from the middle of the optical transmission line.

Although the embodiments of the present invention have been described in detail with reference to the drawings, a specific configuration is not limited to these embodiments, and any design without departing from the gist and scope of the present invention is also included.

INDUSTRIAL APPLICABILITY

The present invention can be applied to an optical transmission system using a multi-core fiber as an optical transmission line.

REFERENCE SIGNS LIST

10, 10*a*, 10*c* Optical transmitter
20 Multi-core optical transmission line
30 Fan-out optical connector
35, 35-1 to 35-N Single-core optical transmission line
40, 40*c* Spectral inversion unit
41-1 to 41-N, 41-1-1 to 41-1-N Nonlinear medium
42-1 to 41-N OBPF
43, 43-1 to 43-*n* CSI optical converter
44-1 to 44-N Polarization beam splitter
45-1 to 45-N Polarization beam combiner
50 Fan-in optical connector
60 Multi-core optical transmission line
70 Optical receiver
80 Optical node
90, 90*c*, 90*d* Relay amplification device
100, 100*a*, 100*b*, 100*c*, 100*d*, 100*e* Optical transmission system
431 Wavelength separation filter
432 Wavelength multiplexing filter

The invention claimed is:

1. An optical transmission system, comprising:

an optical transmitter;

an optical receiver; and a relay amplification device for amplifying and relaying an optical signal, wherein the optical transmitter and the relay amplification device are connected by a first multi-core fiber, the optical receiver and the relay amplification device are connected by a second multi-core fiber, wherein the relay amplification device, comprising:

a brancher configured to branch optical signals transmitted by respective cores of the first multi-core fiber into a plurality of single-core fibers;

a spectrum inverter configured to perform optical parametric amplification on respective optical signals branched into respective single fibers with pump lights to output phase conjugate lights of respective optical signals generated by the optical parametric amplification; and a multiplexer configured to multiplex the phase conjugate lights of respective optical signals output from the spectrum inverter to output to the second multi-core fiber.

2. The optical transmission system according to claim 1, wherein the optical transmitter divides optical signals with different wavelengths into two in a usage band, and transmits each optical signal to each core of the first multi-core fiber so that optical signals with different usage bands are transmitted to congenial cores having large inter-core crosstalk.

3. The optical transmission system according to claim 1, wherein the spectrum inverter comprises, for each of the first multi-core fibers, a nonlinear medium configured to perform optical parametric amplification on optical signals with pump lights, and a band pass filter configured to cut off the amplified optical signals while passing through the phase conjugate lights among optical signals amplified by the optical parametric amplification and phase conjugate lights of the amplified optical signals generated by the optical parametric amplification.

4. The optical transmission system according to claim 1, wherein the optical transmitter divides optical signals with different wavelengths into three in a use band, when selecting, for each core, optical signals belonging to each of two use bands among three use bands divided, selects the optical signals so as to always include a use band on the shortest wavelength side as a combination in each core, and transmits each optical signal to each core of the first multi-core fiber so that an optical signal is transmitted to each core in a combination selected for each core.

5. The optical transmission system according to claim 1, wherein the optical transmitter transmits a polarization multiplexed signal to each core of the first multi-core fiber, the brancher branches polarization multiplexed signals transmitted by respective cores of the first multi-core fiber into a plurality of single-core fibers, the spectrum inverter comprises:

a plurality of polarization beam splitters configured to separate respective polarization multiplexed signals branched into respective single-core fibers for each polarization;

a plurality of nonlinear media configured to perform optical parametric amplification on optical signals separated into respective polarized waves by the respective plurality of polarization beam splitters with pump lights, and for outputting phase conjugate lights of respective optical signals generated by the optical parametric amplification; and a plurality of polarization beam combiners configured to multiplex phase conjugate lights of optical signals of the respective polarization waves.

6. The optical transmission system according to claim 1, further comprising: one or more optical nodes for performing add-drop on optical signals in a middle of an optical transmission line between the optical transmitter and the optical receiver, wherein the relay amplification device is provided at a front stage and a rear stage of the one or more optical nodes.

7. An optical transmission method in an optical transmission system, the system comprising:

an optical transmitter;

an optical receiver; and a relay amplification device for amplifying and relaying an optical signal, wherein the optical transmitter and the relay amplification device are connected by a first multi-core fiber, the optical receiver and the relay amplification device are connected by a second multi-core fiber, wherein the method comprising the steps of:

branching optical signals transmitted by respective cores of the first multi-core fiber into a plurality of single-core fibers;

performing optical parametric amplification on respective optical signals branched into respective single-core fibers with pump lights to output phase conjugate lights of optical signals generated by the optical parametric amplification; and multiplexing output phase conjugate lights of optical signals to output to the second multi-core fiber.

8. A relay amplification device for amplifying and relaying an optical signal in an optical transmission system, the system further comprising: an optical transmitter; and an optical receiver; wherein the relay amplification device comprising:

a brancher configured to branch optical signals transmitted by respective cores of a first multi-core fiber connected with the optical transmitter into a plurality of single-core fibers;

a spectrum inverter configured to perform optical parametric amplification on respective optical signals branched into respective single-core fibers with pump lights to output phase conjugate lights of respective optical signals generated by the optical parametric amplification; and a multiplexer configured to multiplex phase conjugate lights of respective optical signals output from the spectrum inverter to output to a first multi-core fiber connected with the optical receiver.

* * * * *